(12) United States Patent
Okuhara et al.

(10) Patent No.: US 9,102,277 B2
(45) Date of Patent: Aug. 11, 2015

(54) STORAGE STRUCTURE FOR VEHICLE

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Yoshikatsu Okuhara, Aichi-ken (JP); Ryo Nagayama, Kagoshima-ken (JP); Naoki Fujisawa, Aichi-ken (JP); Akihiro Ogihara, Gifu-ken (JP); Hiroshi Mikoshi, Aichi-ken (JP); Toshihiro Sugiyama, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 14/148,014

(22) Filed: Jan. 6, 2014

(65) Prior Publication Data

US 2014/0191529 A1  Jul. 10, 2014
US 2015/0001873 A2  Jan. 1, 2015
US 2015/0108781 A9  Apr. 23, 2015

(30) Foreign Application Priority Data

Jan. 11, 2013  (JP) ................ 2013-003567

(51) Int. Cl.
*A47K 1/08*  (2006.01)
*B60R 7/04*  (2006.01)
(Continued)

(52) U.S. Cl.
CPC ............. *B60R 7/043* (2013.01); *B60N 2/468* (2013.01); *B60N 2/4613* (2013.01); *B60N 3/102* (2013.01)

(58) Field of Classification Search
CPC .... B60N 3/102; B60N 2/4613; B60N 2/4686; B60N 3/105; B60N 3/107; B60N 3/108; B60R 7/04; B60R 7/043

USPC ............ 248/311.2; 224/926, 148.1, 400, 282, 224/281, 679; 206/427; 220/737, 703, 220/62.12; 296/24.34, 37.15
See application file for complete search history.

(56) References Cited

U.S. PATENT DOCUMENTS 5,524,958 A    6/1996  Wieczorek et al.
6,695,271 B2 * 2/2004  Bieck et al. ................ 248/311.2
(Continued)

FOREIGN PATENT DOCUMENTS

DE  102007005756   8/2008
JP   57-006467     6/1955
(Continued)

OTHER PUBLICATIONS

German Official Action dated Oct. 16, 2014, along with English-language translation thereof.
(Continued)

*Primary Examiner* — Todd M Epps
(74) *Attorney, Agent, or Firm* — Greenblum & Bernstein, P.L.C.

(57) ABSTRACT

A storage structure for a vehicle includes a storage part that is movable between a use position and a retracted position and is biased toward the use position; a lock mechanism that locks the storage part in the retracted position; and a button that is provided separately from the storage part and is used to unlock the storage part that is locked by the lock mechanism. The storage part is not moved to the use position by pressing the button from an initial position, and the storage part is moved to the use position by restoring the button from the pressed state to the initial position.

5 Claims, 4 Drawing Sheets

(51) Int. Cl.
    *B60N 3/10*     (2006.01)
    *B60N 2/46*     (2006.01)

(56) References Cited

U.S. PATENT DOCUMENTS

2003/0062459 A1* 4/2003 Bieck et al. ................ 248/311.2
2008/0079278 A1* 4/2008 Rajappa et al. ............ 296/24.34

FOREIGN PATENT DOCUMENTS

| JP | 61-113977 | 5/1986 |
|---|---|---|
| JP | 2000-085815 | 3/2000 |
| JP | 2004-161206 | 6/2004 |
| JP | 2005-200935 | 7/2005 |
| JP | 2006-022482 | 1/2006 |
| JP | 2010-137761 | 6/2010 |
| JP | 2011-20605 | 2/2011 |

OTHER PUBLICATIONS

Japanese Official Action for JP 2013-003567 dated Dec. 2, 2014, along with an English-language translation thereof.

* cited by examiner

STORAGE STRUCTURE FOR VEHICLE

INCORPORATION BY REFERENCE

The disclosure of Japanese Patent Application No. 2013-003567 filed on Jan. 10, 2013 including the specification, drawings and abstract is incorporated herein by reference in its entirety.

BACKGROUND OF THE INVENTION

1. Field of the Invention

The present invention relates to a storage structure for a vehicle. More specifically, the present invention relates to a storage structure for a vehicle which has a storage part that can be moved to a use position by pressing a button that is provided separately from the storage part.

2. Description of Related Art

A storage structure that is used to contain items is provided in a vehicle. A storage structure which has a storage part that can be shifted to a use state (for example, a state of being protruded forward) or a retracted state (for example, a state of being retracted backward) by pressing the storage part is known. A storage structure which has a storage part that is configured to pop out forward when a button that is provided separately from the storage part is pressed is also known (refer to Japanese Patent Application Publication No. 2011-20605 (JP 2011-20605 A)). The storage structure which has a storage part that can be shifted to a use state or retracted state by pressing the storage part employs what is called a heart cam structure. Thus, the storage part is relatively difficult to maintain in the retracted state firmly. In other words, the structure that is provided with a button with which the retracted state can be cancelled separately from the storage part is superior in view of the ability to maintain the retracted state.

SUMMARY OF THE INVENTION

However, in the case of a storage structure of the type that has a button which is provided separately from a storage part, the storage part is configured to pop out forward when the button is pressed. Thus, there is a possibility that the nail of the finger that is used to press the button is caught by the storage part when the storage part pops out forward and the user feels uncomfortable. Such a situation might be able to be avoided when the user draws the finger away from the button as soon as the user presses the button. However, the fact that the contact between the storage part and the finger cannot be avoided unless the storage part is used in this way might impose a burden on the user.

The present invention provides a storage structure for a vehicle that can prevent a situation in which the finger of the user contacts the storage part when the retracted state of the storage part is cancelled by pressing a button.

A storage structure for a vehicle according to an aspect of the present invention includes a storage part that is movable between a use position and a retracted position and is biased toward the use position; a lock mechanism that locks the storage part in the retracted position; and a button that is provided separately from the storage part and is used to unlock the storage part that is locked by the lock mechanism. The storage part is not moved to the use position by pressing the button from an initial position, and the storage part is moved to the use position by restoring the button from the pressed state to the initial position.

In this embodiment, the storage part cannot be moved to the use position by pressing the button from its initial position, and the storage part is moved to the use position by restoring the button from the pressed state to its initial position. Thus, the direction in which the finger of the user is moved to operate the button and the direction in which the storage part moves are not opposite to each other. Thus, even when the storage part pops out forward, the finger of the user can be prevented from contacting the storage part. In addition, because the user can stop pressing the button any time the user likes, the storage part is easy to use for the user.

In the above aspect, the lock mechanism is able to create a first lock state and a second lock state, and the first lock state is cancelled by pressing the button and the second lock state is cancelled by shifting the button from the pressed state to the initial position, According to the above aspect, because the first lock state, which is used as a normal lock state, is cancelled and the second lock state, which is easier to cancel than the first lock state, is instead created by pressing the button, the entire unlocking operation can be carried out smoothly.

In the above aspect, the lock mechanism is constituted of a first engaging member that is movably attached to the storage part, a second engaging member that is located adjacent to the storage part, and a first unlocking member that moves the first engaging member. A first lock state is created by a contact of the first engaging member with the second engaging member, and the first unlocking member cancels the first lock state by moving the first engaging member and creates a second lock state when brought into contact with the first engaging member in a direction in which the storage part is biased.

According to the above aspect, because the members that are used to cancel the first lock state are also used to create the second lock state, the number of parts is small and the time and effort for the assembly can be minimized.

According to the aspect of the present invention, a situation in which the finger of the user contacts the storage part when the retracted state of the storage part is cancelled by pressing a button can be prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
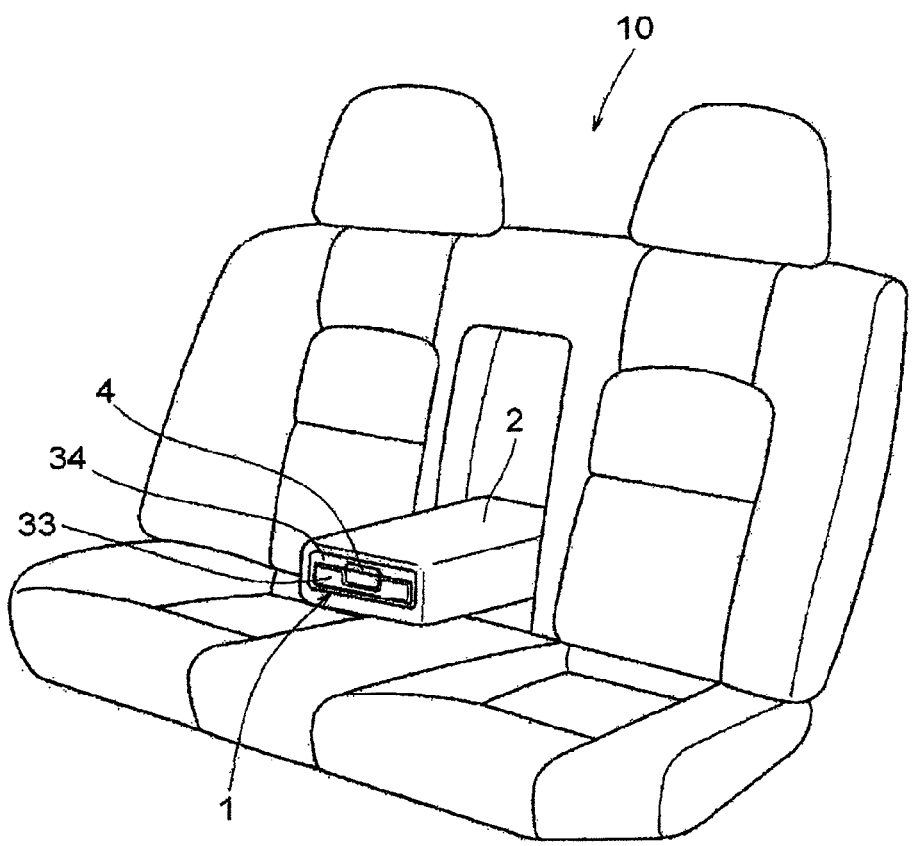
FIG. 1 is a diagram that illustrates the concept in which a storage structure according to the present invention is adapted to a vehicle seat.
Figure 2:
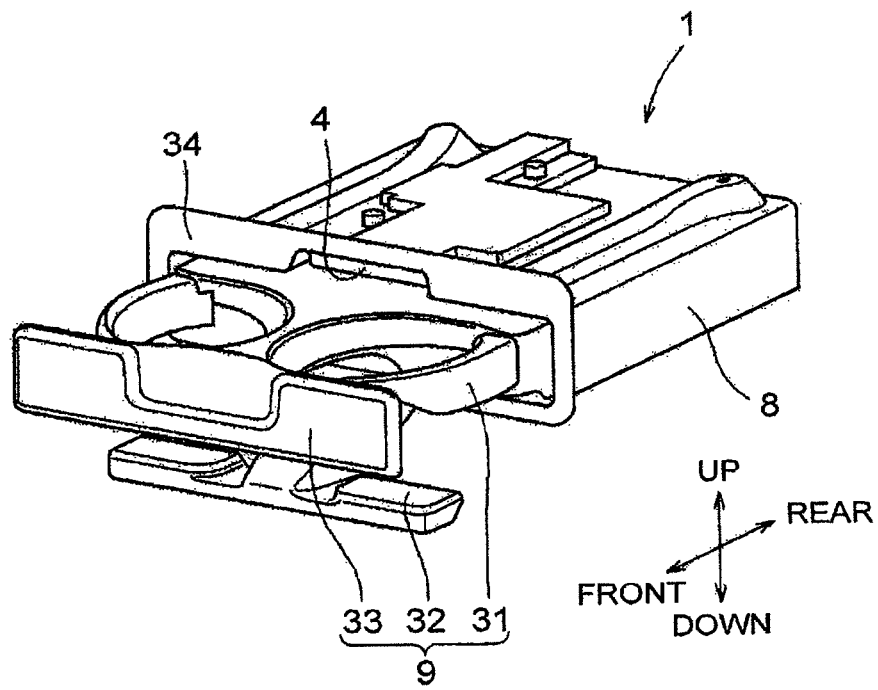
FIG. 2 is a perspective view of the storage structure with its cup holder as a storage part in a use position.

Description is hereinafter made of a mode for carrying out the present invention with reference to the drawings. The indication of directions, such as upward, downward, forward and backward, in this description is used for the convenience of description. Thus, the indication does not mean that each member should absolutely be arranged as described herein. The direction in which a storage part 3 (cup holder 9) pops out toward a use position as shown in FIG. 2 is herein defined as forward and the opposite direction, the direction in which the storage part 3 (cup holder 9) moves toward a retracted position, is defined as backward. First, the state where a storage structure 1 is adopted to a vehicle is described. FIG. 1 is a diagram that illustrates the way in which a storage structure 1 according to the present invention is incorporated in an armrest 2 at the center of a vehicle rear seat 10. The storage structure 1 is provided at an end of a rotatable armrest 2. Because the storage structure 1 is located in this position, the storage part 3 (cup holder 9) can pop out toward the front of the vehicle when the longitudinal direction of the armrest 2 is oriented to the front-back direction. While the armrest 2 can be retracted by orienting its longitudinal direction in the vertical direction, the description of the armrest 2 is omitted because its manner of use is well known as a related art.

Figure 3:
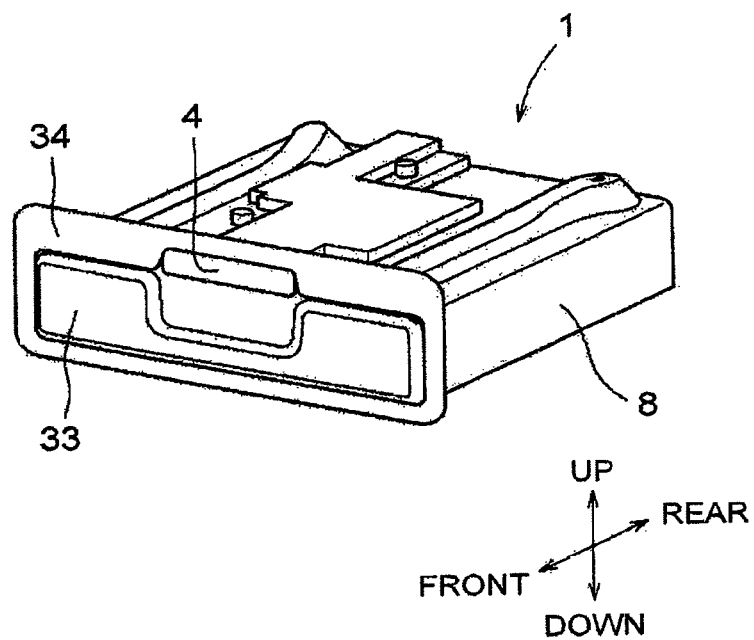
FIG. 3 is a perspective view of the storage structure with its cup holder as a storage part in a retracted position.

The general structure of the storage structure 1 according to an embodiment is next described. In this embodiment, an example in which a cup holder 9 that includes a holder 31 and a tray 32 is provided as the storage part 3 is described. A door part 33 that is provided to be able to close an opening of a housing 8 is provided on the front side of the holder 31. The storage part 3 (cup holder 9) can be retracted into the housing 8 and can be moved to a position in which it is almost entirely exposed outside of the housing 8 as shown in FIG. 2 and FIG. 3. A bezel 34 is located in front of the housing 8. As shown in FIG. 3, a button 4 is located in a gap that is formed between the bezel 34 and the door part 33, and the door part 33, which constitutes a part of the storage part 3 (cup holder 9), and the button 4 are located adjacent to each other. A use state is the state where the storage part 3 (cup holder 9) is positioned at an end of the side toward which the storage part 3 (cup holder 9) protrudes from the opening of the housing 8 as shown in FIG. 2. When the use state is established, the storage part 3 (cup holder 9) is positioned in a use position. The state where the storage part 3 (cup holder 9) has been inserted into the housing 8 and locked as shown in FIG. 3 is a retracted state. The storage part 3 (cup holder 9) is positioned in a retracted position when the retracted state is established.

Figure 4:
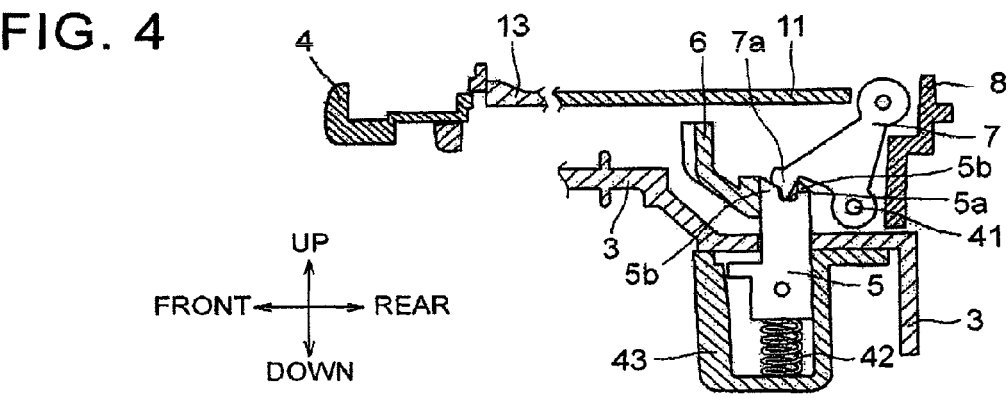
FIG. 4 is a diagram that illustrates a first lock state.
Figure 5:
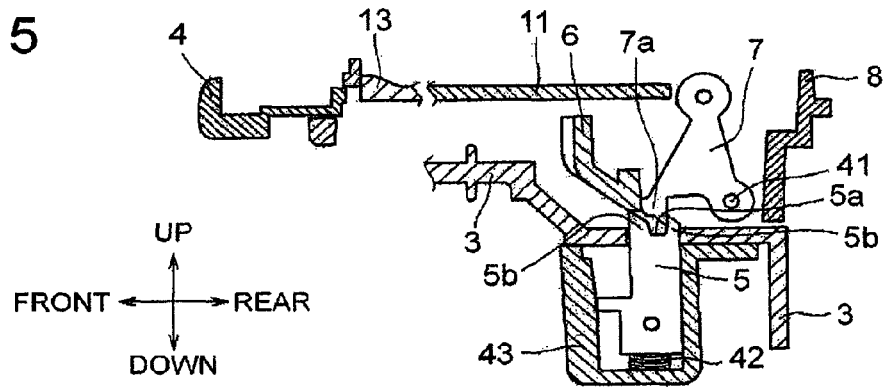
FIG. 5 is a diagram that illustrates a second lock state.
Figure 6:
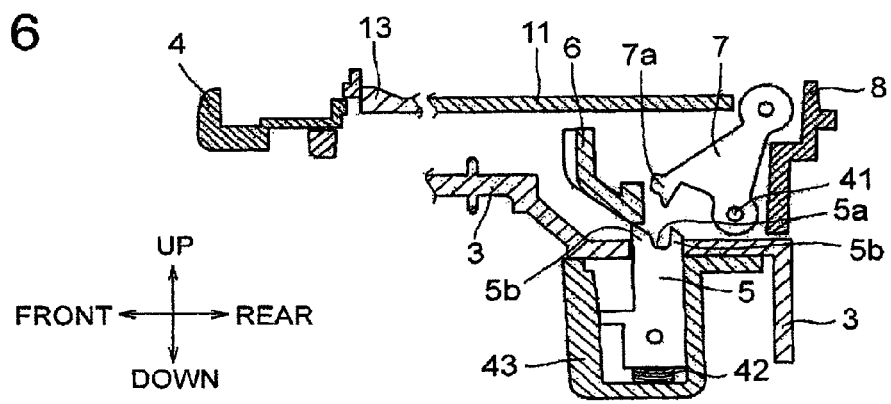
FIG. 6 is a diagram that illustrates a state in which the second lock state is cancelled.

The housing 8 is provided with a biasing member (not shown) that biases the storage part 3 (cup holder 9) toward the use position when the storage part 3 (cup holder 9) is in the retracted state. The biasing member is constituted of a leaf spring. Because the leaf spring has been wound when the storage part 3 (cup holder 9) is in the retracted position, the elastic force of the leaf spring, which tends to return to its original state from the wound state, biases the storage part 3 toward the use position. As shown in FIG. 4, the storage part 3 (cup holder 9) is provided with a first engaging member 5 that is movable up and down, and the first engaging member 5 is biased upward by a lock spring 42, which is an elastic body that is provided under the first engaging member 5. The lock spring 42 and the first engaging member 5 are supported in a support vessel 43 that is attached to the storage part 3 (cup holder 9). The first engaging member 5 is configured to be contactable with a second engaging member 6 that is provided in the housing 8. More specifically, the first engaging member 5 and the second engaging member 6 are contactable with each other in the front-back direction when the first engaging member 5 is in its upper position as shown in FIG. 4, whereas the first engaging member 5 and the second engaging member 6 are not in contact with each other in the front-back direction when the first engaging member 5 is in its lower position as shown in FIG. 5 and FIG. 6.

Figure 7:
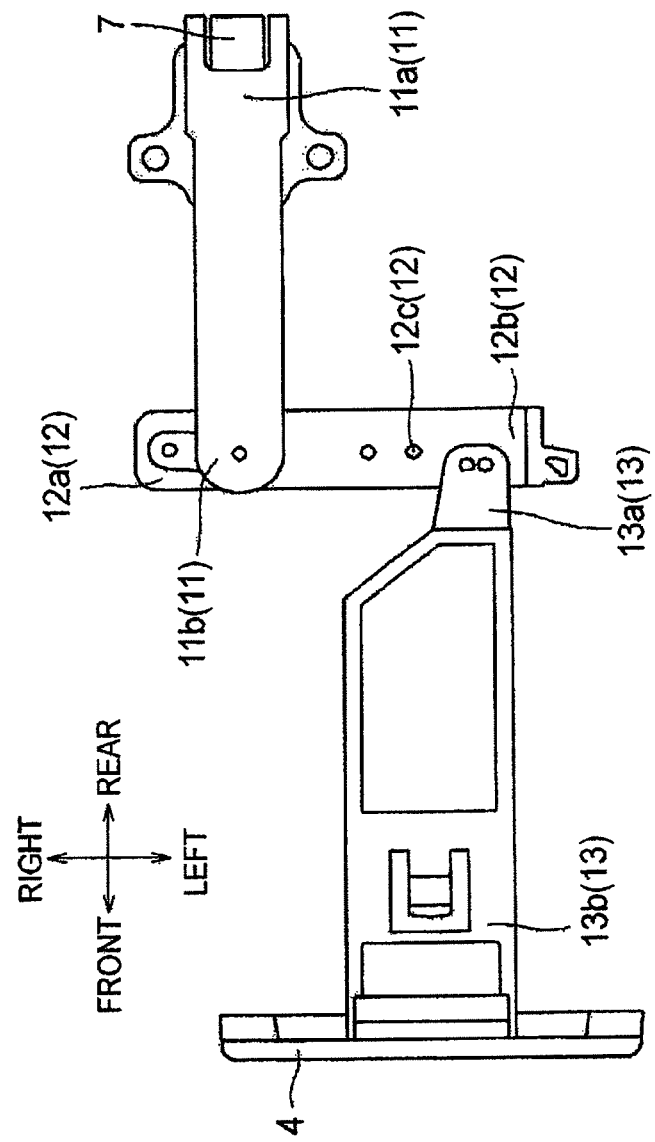
FIG. 7 is a diagram that illustrates a link mechanism.

The mechanism that moves the first engaging member 5 is described. The first engaging member 5 is moved downward when pressed by a first unlocking member. The first unlocking member is constituted of a lock link 7 that has a generally triangular cross-sectional shape. The lock link 7 has a protrusion 7a at one of the apexes of the triangle, and the protrusion 7a is configured to be contactable with the first engaging member 5. The lock link 7 is configured to be tilted about a lock link rotating shaft 41 when the button 4 is pressed, and the protrusion 7a moves downward when the lock link 7 is tilted. When the finger is released from the button 4 in the pressed state, the lock link 7 is restored from the tilted state and, consequently, the protrusion 7a returns upward. Two projections 5b are provided at the upper end of the first engaging member 5 to form a recessed portion 5a, and the protrusion 7a of the lock link 7 is configured to be able to be inserted into the recessed portion 5a. As shown in FIG. 7, the lock link 7 is linked to a first end 11a of a first rod, and the first rod has a second end 11b that is linked to a first end 12a of a second rod. The second rod has a second end 12b that is linked to a first end 13a of a third rod. The third rod has a second end 13b that is coupled to the button 4. In other words, the first engaging member 5 can be moved by moving the first to third rods 11, 12 and 13 and the lock link 7 by pressing the button 4. The second rod 12 has a pivot hole 12c that extends therethrough in a direction perpendicular to its longitudinal direction. A pivot shaft that is provided in the housing 8 is inserted in the pivot hole 12c. Thus, the second rod 12 can only be rotated about the pivot shaft. Thus, when the second end 12b of the second rod is moved backward by the third rod 13, the first end 12a of the second rod is moved forward, and the first rod 11, which is linked to the second rod 12, is also moved forward. In other words, when the button 4 is pressed, the button 4 is moved backward whereas the first rod 11 is moved forward, and the lock link 7, which is linked to the first rod 11, is tilted forward. When the lock link 7 is tilted forward, the protrusion 7a of the lock link 7 pushes the first engaging member 5 downward. It should be noted that the pivot hole 12c of the second rod 12 is not located near the center thereof in its longitudinal direction, and the ratio between the distance from the linking point on the side of the second end 12b of the second rod to the pivot shaft and the distance from the linking point on the side of the first end 12a of the second rod to the pivot shaft is greater than 1, more specifically, approximately 2 to 3. Thus, the distance the first rod 11 travels can be longer than the depth the button can be pressed.

In this embodiment, the second engaging member 6 has a tilted face that is tilted obliquely forward and upward. Each of the two projections 5b of the first engaging member 5 has a tilted face that is tilted in the same direction as the tilted face of the second engaging member 6. Thus, when the storage part 3 is moved backward, the tilted faces of the first engaging member 5 can slide against the tilted face of the second engaging member 6. In addition, as the storage part 3 is moved backward, the first engaging member 5 is moved downward. When the storage part 3 is further moved, the force that acts to move the first engaging member 5 downward is not applied thereto any more after the front projection 5b of the first engaging member 5 passes the rear end of the second engaging member 6. Thus, because only the elastic force of the lock spring 42, which is provided under the first engaging member 5, is applied to the first engaging member 5, the first engaging member 5 is moved upward. When the first engaging member 5 is moved upward, the first engaging member 5 is brought into contact with the second engaging member 6 and the lock link 7. When the first engaging member 5 is brought into contact with the second engaging member 6, the recessed portion 5a of the first engaging member 5 receives the protrusion 7a of the lock link 7.

The method for cancelling the lock state is next described. Prior to the description, a lock mechanism is described. The lock state is created by the lock mechanism. In this embodiment, the lock mechanism is constituted of the first engaging member 5, the second engaging member 6 and the lock link 7. The state that is shown in FIG. 4 is a first lock state. The first lock state is created by the contact of the first engaging member 5 with the second engaging member 6, which is located at a periphery of the storage part 3. The state that is shown in FIG. 5 is a second lock state. The second lock state is created by the contact of the first engaging member 5 with the lock link 7 as a first unlocking member in a biasing direction in which the storage part 3 is biased. To cancel the first lock state, the button 4 has to be pressed. When the button 4 is pressed, the protrusion 7a of the lock link 7 in contact with the first engaging member 5 is moved downward and moves the first engaging member 5 downward. When the first engaging member 5 is moved downward, the first engaging member 5 is separated from the second engaging member 6 and the first lock state is cancelled. While the first lock state is cancelled, the protrusion 7a of the lock link 7, which is received in the recessed portion 5a of the first engaging member 5, is brought into contact with an inner surface of the recessed portion 5a of the first engaging member 5, whereby the second lock state is created. Thus, the cancel of the first lock state and the transition to the second lock state are achieved smoothly. The second lock state is cancelled by moving the protrusion 7a upward as shown in FIG. 6, and, what it necessary to move the protrusion 7a upward is to restore the lock link 7 to the tilted state. In this embodiment, when the button 4 is restored from the pressed state to its initial state, the lock link 7 is restored to the tilted state. Because the button 4 is biased forward, the second lock state is automatically cancelled by stopping pressing the button 4, in other words, by moving the finger forward. Because the storage part 3 is biased toward the use position, when the second lock state is cancelled, the storage part 3 is automatically moved to the use position. Thus, the storage part 3 can be set in a usable state by simply pressing the button 4. In this embodiment, the holder 31 and the tray 32 are moved forward but the tray 32 is not automatically moved downward. However, the holder 31 can be automatically moved downward by placing a container or the like in the holder 31.

The method for creating a lock state is next described. In this embodiment, the first lock state is automatically created when the storage part 3 is pressed from the use position to the retracted position. This is because when the storage part 3 is moved backward, the tilted faces of the first engaging member 5 slide against the tilted face of the second engaging member 6, and the first engaging member 5 is moved upward and brought into contact with the second engaging member 6 after the front projection 5b of the first engaging member 5 passes the rear end of the second engaging member 6 as described above. In this embodiment, the tray 32 has to be moved upward to bring the holder 31 and the tray 32 to be adjacent to each other before the, holder 31 and the tray 32 are moved backward. A sufficient frictional force is set to be applied to the pivot shaft of the tray 32 so that the tray 32 can be prevented from being moved downward by its own weight after the tray 32 has been moved upward. This technique is within the scope of common practice and therefore its detailed description is omitted.

In this embodiment, the storage part 3 cannot be moved to the use position by pressing the button 4 from its initial position, and the storage part 3 is moved to the use position by restoring the button 4 from the pressed state to its initial position. Thus, the direction in which the finger of the user is moved to operate the button and the direction in which the storage part 3 moves are not opposite to each other. Thus, even when the storage part 3 pops out forward, the finger of the user can be prevented from contacting the storage part 3. In addition, because the user can stop pressing the button 4 any time the user likes, the storage part 3 is easy to use for the user. Moreover, because the first lock state, which is used as a normal lock state, is cancelled and the second lock state, which is easier to cancel than the first lock state, is instead created by pressing the button 4, the entire unlocking operation can be carried out smoothly. Further, because the members that are used to cancel the first lock state are also used to create the second lock state, the number of parts is small and the time and effort for the assembly can be minimized.

While one embodiment has been described in the foregoing, the present invention can be implemented in many different modes in addition to the above embodiment. For example, the storage part does not necessarily have to be a cup holder but may be embodied in various forms, such as glove box, overhead console and change box. The storage part does not necessarily have to be moved back and forth linearly. A rotatable storage part as used for an ordinary glove box may be moved in a tilting fashion. The biasing member that is used to bias the storage part from the retracted position to the use position does not necessarily have to be an elastic body, such as a spring. For example, the storage part may be placed in a tilted state so that the storage part can be biased toward the use position by its own weight. As far as the storage structure is concerned, the storage part does not necessarily have to be placed in a housing as long as it supported by some means. For example, the storage part may be attached to and supported by a plate that has an opening, or may be supported by a frame that is located on an upper, lower or side part of the storage part. While the storage part is intended to be moved back and force in this embodiment, the present invention is not limited to this aspect. The storage part may be configured to be moved up and down, and does not necessarily have to be configured to be moved back and forth or up and down. The button does not necessarily have to be located between the bezel and the door part, and the bezel does not necessarily have to be provided. The present invention can be adapted not only to vehicles but also to various transportation means such as airplanes and ships.

What is claimed is:

1. A storage structure for a vehicle, comprising:
   a storage part that is slidable between a use position and a retracted position when the storage part is unlocked, and that is biased toward the use position;
   a lock mechanism that locks the storage part in the retracted position; and
   a button that is provided separately from the storage part and is used to unlock the storage part that is locked by the lock mechanism,
   wherein the storage part is not moved to the use position by pressing the button from an initial position to a pressed state, and the storage part is moved to the use position by restoring the button from the pressed state to the initial position.

2. The storage structure according to claim 1,
   wherein the lock mechanism is lockable in a first lock state and a second lock state, and the first lock state is cancelled by pressing the button and the second lock state is cancelled by shifting the button from the pressed state to the initial position.

3. The storage structure according to claim 1,
wherein the lock mechanism is a first engaging member that is movably attached to the storage part, a second engaging member that is located adjacent to the storage part, and a first unlocking member that moves the first engaging member, and
wherein when the first engaging member is in contact with the second engaging member the lock mechanism is in a first lock state, and the first unlocking member is configured to cancel the first lock state by moving the first engaging member and to lock the lock mechanism in a second lock state when brought into contact with the first engaging member in a direction in which the storage part is biased.

4. The storage structure according to claim 2,
wherein the lock mechanism is a first engaging member that is movably attached to the storage part, a second engaging member that is located adjacent to the storage part, and a first unlocking member that moves the first engaging member, and
wherein when the first engaging member is in contact with the second engaging member the lock mechanism is in the first lock state, and the first unlocking member is configured to cancel the first lock state by moving the first engaging member and to lock the lock mechanism in the second lock state when brought into contact with the first engaging member in a direction in which the storage part is biased.

5. The storage structure according to claim 3,
wherein the first engaging member includes two projections that extend from an upper end of the first engaging member and define a recessed portion therebetween,
wherein the first unlocking member includes a protrusion that extends downward and is removably engagable with the recessed portion of the first engaging member,
wherein in the first lock state, the first engaging member contacts the second engaging member and the protrusion of the first unlocking member is engaged with the recessed portion of the first engaging member, and
wherein in the second lock state, the protrusion of the first unlocking member biases the first engaging member downward and the first engaging member is separated from the second engaging member.

\* \* \* \* \*